US010698366B2

United States Patent
Lim et al.

(10) Patent No.: US 10,698,366 B2
(45) Date of Patent: Jun. 30, 2020

(54) METHOD AND APPARATUS FOR GENERATING DIGITAL COLOR HOLOGRAM, AND DIGITAL COLOR HOLOGRAPHIC DISPLAY DEVICE USING TILING

(71) Applicant: ELECTRONICS AND TELECOMMUNICATIONS RESEARCH INSTITUTE, Daejeon (KR)

(72) Inventors: Yongjun Lim, Sejong (KR); Keehoon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 15/867,569

(22) Filed: Jan. 10, 2018

(65) Prior Publication Data
US 2018/0292787 A1    Oct. 11, 2018

(30) Foreign Application Priority Data

Apr. 6, 2017  (KR) .................. 10-2017-0044920

(51) Int. Cl.
*G03H 1/30* (2006.01)
*G02B 27/12* (2006.01)
(Continued)

(52) U.S. Cl.
CPC ............ *G03H 1/30* (2013.01); *G02B 27/1026* (2013.01); *G02B 27/126* (2013.01); *G02B 27/149* (2013.01); *G02B 30/50* (2020.01); *G03H 1/2205* (2013.01); *G03H 1/2294* (2013.01); *G02B 27/1006* (2013.01); *G03H 2001/221* (2013.01); *G03H 2001/2218* (2013.01); *G03H 2001/2271* (2013.01); *G03H 2001/306* (2013.01); *G03H 2222/12* (2013.01); *G03H 2222/18* (2013.01); *G03H 2222/34* (2013.01);
(Continued)

(58) Field of Classification Search
CPC ......... G02B 27/126; G03H 2001/2271; G03H 2222/18; G03H 2222/34
See application file for complete search history.

(56) References Cited

U.S. PATENT DOCUMENTS 6,863,400 B1   3/2005  Liang
8,317,330 B2 * 11/2012 Yamazaki .......... G02B 27/0172
                                                    353/30
(Continued)

FOREIGN PATENT DOCUMENTS

KR   10-2016-0083444 A   7/2016

OTHER PUBLICATIONS

Hesper et. al. (Advanced Fluorescence Microscopy: Methods and Protocols, Methods in Molecular Biology, vol. 1251, pp. 175-192) (Year: 2015).*

*Primary Examiner* — Robert E. Tallman

(57) ABSTRACT

Disclosed is a digital color holographic display device using tiling, including: a plurality of digital color hologram generating units generating digital color holograms, respectively; and a tiling unit spatially arranging the digital color holograms of the plurality of digital color hologram generating units through an optical tiling method so as not to overlap with each other.

9 Claims, 13 Drawing Sheets

(51) Int. Cl.
*G02B 27/14* (2006.01)
*G02B 27/10* (2006.01)
*G03H 1/22* (2006.01)
*G02B 30/50* (2020.01)

(52) U.S. Cl.
CPC ..... *G03H 2223/18* (2013.01); *G03H 2225/24* (2013.01); *G03H 2225/60* (2013.01); *G03H 2225/61* (2013.01)

(56) References Cited

U.S. PATENT DOCUMENTS

| | | | |
|---|---|---|---|
| 2003/0048423 A1* | 3/2003 | Aastuen | G02B 27/1026 353/31 |
| 2009/0128903 A1* | 5/2009 | Sano | G02B 27/283 359/485.01 |
| 2012/0218481 A1* | 8/2012 | Popovich | G02B 5/1819 349/11 |
| 2015/0085331 A1 | 3/2015 | Chae | |
| 2015/0234350 A1 | 8/2015 | Park et al. | |

* cited by examiner

US 10,698,366 B2

METHOD AND APPARATUS FOR GENERATING DIGITAL COLOR HOLOGRAM, AND DIGITAL COLOR HOLOGRAPHIC DISPLAY DEVICE USING TILING

CROSS-REFERENCE TO RELATED APPLICATION

This application claims priority to and the benefit of Korean Patent Application No. 10-2017-0044920 filed in the Korean Intellectual Property Office on Apr. 6, 2017, the entire contents of which are incorporated herein by reference.

BACKGROUND OF THE INVENTION

(a) Field of the Invention

The present invention relates to a method and an apparatus for generating a digital color hologram, and a digital color holographic display device using tiling.

(b) Description of the Related Art

Digital holography is a technique for displaying three-dimensional images by displaying brightness information and phase information of light on a spatial light modulator (SLM) using a laser, which is a coherent light source.

In order to realize a digital holography display system, an SLM capable of modulating the brightness or phase information of the light is required, and a liquid crystal (LC), a liquid crystal on silicon (LCoS), a digital micro-mirror device (DMD), and the like are used as the SLM.

Performance of the SLM finally determines resolution, a viewing angle, and a size of the image that a user meets. The resolution of the SLM determines the size of the image, and each pixel size or pixel interval of the SLM determines the viewing angle.

The viewing angle θ of a hologram image satisfies a relationship of Equation 1 by the pixel interval p which is a physical feature of the SLM, and a magnitude (λ) of a wavelength of a light source incident on the SLM.

$$\theta = \sin^{-1}\left(\frac{\lambda}{2p}\right) \quad \text{(Equation 1)}$$

However, due to limitations in performance such as a finite pixel size and resolution of currently available SLMs, it is limited to form digital color holograms with large image planes only by a flat SLM structure.

Therefore, in order to increase the image size of the digital color hologram without expanding the effective pixel size and pixel interval, it is necessary to arrange optical signals output from multiple SLMs without overlapping in a space using an optical method.

SUMMARY OF THE INVENTION

The present invention has been made in an effort to provide a method and an apparatus for generating a digital color hologram, and a digital color holographic display device using tiling, which can increase an image size of a digital color hologram through an optical tiling method without loss of a viewing angle and expansion of a pixel interval.

An exemplary embodiment of the present invention provides an apparatus for generating a digital color hologram. The apparatus for generating a digital color hologram includes: a white light source generating unit generating white light; and a color hologram generating unit. The color hologram generating unit includes first to third space light modulator in which computer generated holograms (CHGs) of first to third colors are displayed, respectively and separates the white light into light of a first color, light of a second color, and light of a third color and outputs the first color light, the second color light, and the third color light to the first to third space light modulators, respectively to generate a digital color hologram.

The white light source generating unit may include first to third laser light sources outputting the light of the first to third colors, respectively, a beam combiner combining the light of the first to third colors to generate the white light, and a beam expander expanding the white light to a plane wave of uniform intensity and outputting the plane wave to the color hologram generating unit.

The color hologram generating unit may include a total reflection prism totally reflecting the white light and transmitting holograms of the first to third colors output from the first to third space light modulators, and a trichroic prism separating the white light totally reflected by the total reflection prism into first to third light and outputting the first to third light to the first to third space light modulators.

The first to third space light modulators may diffract and output the light of the first to third colors by the CGHs of the first to third colors, and the color hologram generating unit may include a hologram synthesizing unit synthesizing the holograms of the respective colors output from the first to third space light modulators to generate the digital color hologram.

The first color, the second color, and the third color may be red, green, and blue, respectively.

Another exemplary embodiment of the present invention provides a method for generating a digital color hologram by a digital color hologram generating apparatus. The method includes: generating white light; separating the white light into light of a first color, a second color, and a third color; causing the light of the first to third colors to be incident on first to third space light modulators in which computer generated holograms (CGHs) of the first to third colors are displayed, respectively; and generating a digital color hologram by synthesizing holograms of the first to third colors output from the first to third space light modulators.

The generating of the white light may include combining the light of the first to third colors to generate the white light, and expanding the white light to a plane wave with uniform intensity.

Yet another exemplary embodiment of the present invention provides a digital color holographic display device using tiling. The device may include: a plurality of digital color hologram generating units generating digital color holograms, respectively; and a tiling unit spatially arranging the digital color holograms of the plurality of digital color hologram generating units through an optical tiling method so as not to overlap with each other.

The tiling unit may include a first lens forming digital color holograms of two digital color hologram generating units on a focal plane of a first focal distance, a first beam combiner outputting each of the digital color holograms of two digital color hologram generating units passing through the first lens, a filter positioned on the focal plane of the first lens and filtering each of the digital color holograms of two digital color hologram generating units formed on the focal plane of the first lens, and a second lens forming the filtered digital color holograms on the focal plane of a second focal distance so as not to overlap with each other.

When the two digital color hologram generating units form a pair, the numbers of first lenses, first beam combiners, and filters may correspond to the number of pairs, and the tiling unit may further include a second beam combiner for outputting each of the filtered digital color holograms output from the filter to the second lens when the number of filters is 2 or more.

The first beam combiner may be a beam separator transmitting or reflecting the input digital color hologram.

The tiling unit may include a plurality of first lenses forming the digital color holograms of a plurality of digital color hologram generating units on the focal plane of the first focal distance, respectively, a plurality of first filters filtering a plurality of digital color holograms passing through the plurality of first lenses, respectively, a plurality of first total reflection prisms totally reflecting the filtered digital color holograms passing through the plurality of first filters, respectively, a plurality of second lenses forming the digital color holograms totally reflected by the plurality of first total reflection prisms, respectively on the focal plane of the second focal distance, respectively, and a plurality of second total reflection prisms positioned on the focal planes of the second focal distances of the plurality of second lenses, respectively to totally reflect the digital color hologram on the focal plane of the second focal distance, and the plurality of digital color holograms totally reflected by the plurality of second total reflection prisms may be formed in space without overlapping with each other.

Each of the plurality of digital color hologram generating units may include a white light source generating unit generating white light, and a color hologram generating unit including first to third space light modulator in which computer generated holograms (CHGs) of first to third colors are displayed, respectively and separating the white light into light of a first color, light of a second color, and light of a third color and outputting the first color light, the second color light, and the third color light to the first to third space light modulators, respectively to generate a digital color hologram.

The white light source generating unit may include first to third laser light sources outputting the light of the first to third colors, respectively, a beam combiner combining the light of the first to third colors to generate the white light, and a beam expander expanding the white light to a plane wave with uniform intensity and outputting the plane wave to the color hologram generating unit.

The color hologram generating unit may include a total reflection prism totally reflecting the white light and transmitting holograms of the first to third colors output from the first to third space light modulators, and a trichroic prism separating the white light totally reflected by the total reflection prism into first to third light and outputting the first to third light to the first to third space light modulators.

The first to third space light modulators may diffract and output the light of the first to third colors by the CGHs of the first to third colors, and the color hologram generating unit may include a hologram synthesizing unit synthesizing the holograms of the respective colors output from the first to third space light modulators to generate the digital color hologram.

Each of the plurality of digital color hologram generating units may include first to third space light modulators diffracting the light of the first to third colors incident while the computer generated holograms (CGHs) of the first to third colors are displayed, respectively by the CGHs of the first to third colors, first to third laser light sources outputting the light of the first to third colors, respectively, first to third beam expanders expanding the light of the first to third colors to the plane wave with uniform intensity, first to third total reflection prisms totally reflecting the light of first to third colors output from the first to third beam expanders and outputting the totally reflected light to the first to third space light modulators, respectively, and an X-cube prism outputting the holograms of the first to third colors diffracted by the first to third space light modulators, respectively.

DETAILED DESCRIPTION OF THE EMBODIMENTS

Figure 1:
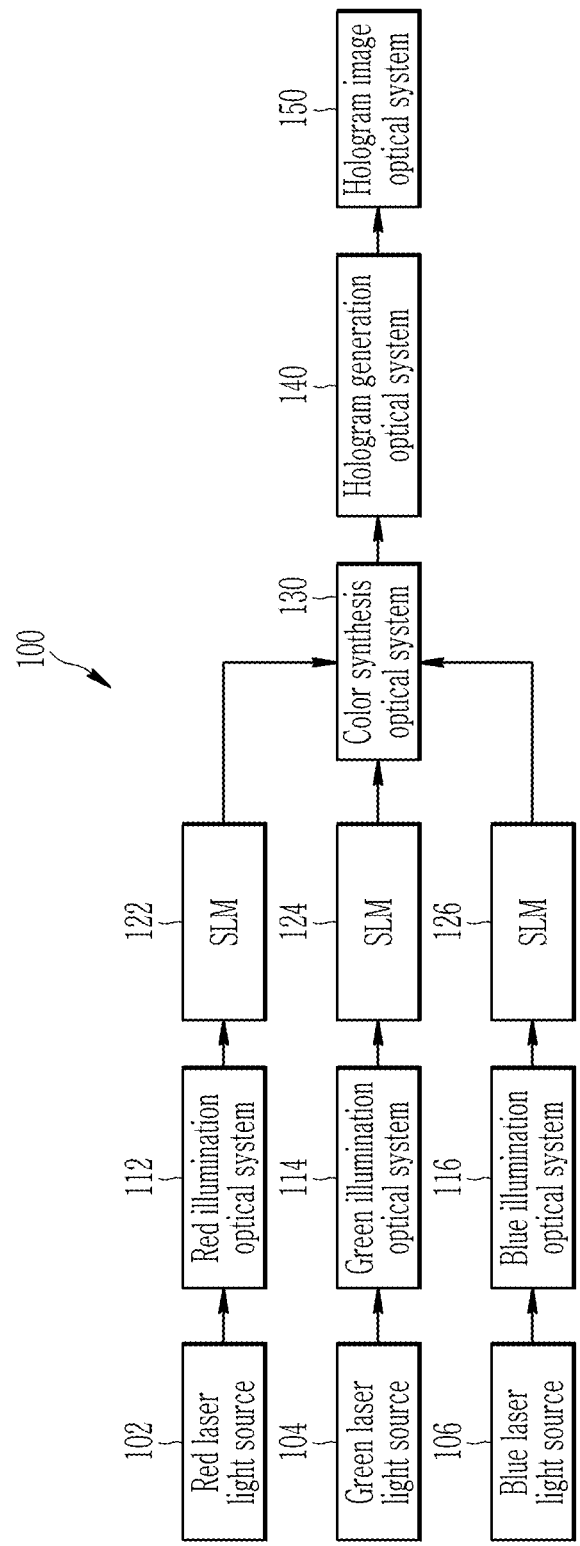
FIG. 1 is a diagram illustrating a normal digital color holographic display device.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising", will be understood to imply the inclusion of stated elements but not the exclusion of any other elements.

Hereinafter, a method and an apparatus for generating a digital color hologram, and a digital color holographic display device using tiling according to exemplary embodiments of the present invention will be described in detail with reference to drawings.

FIG. 1 is a diagram illustrating a normal digital color holographic display device.

Referring to FIG. 1, the digital color holographic display device 100 may include a red laser light source 102, a green laser light source 104, a blue laser light source 106, a red illumination optical system 112, a green illumination optical system 114, a blue illumination optical system 116, SLMs 122, 124, and 126, a color synthesis optical system 130, a hologram generation optical system 140, and a hologram image optical system 150.

In the case of a color hologram, a coherent light source may be used as an incident light source. For example, the red laser light source 102, the green laser light source 104, and the blue laser light source 106 may be used as the incident light source.

The red laser light source 102, the green laser light source 104, and the blue laser light source 106 output red, green, and blue light, respectively. The red laser light source 102, the green laser light source 104, and the blue laser light source 106 output light having a single wavelength among 620 nm to 670 nm, 510 nm to 560 nm, and 440 nm to 490 nm, respectively.

The red illumination optical system 112, the green illumination optical system 114, and the blue illumination optical system 116 irradiate the red, green, and blue light, respectively with uniform intensity and phase over an entire area of the SLMs 122, 124, and 126.

A computer generated hologram (CGH) of each color is displayed on the SLMs 122, 124, and 126, and light of a corresponding color is diffracted and output by the CGH displayed on the SLM.

The color synthesis optical system 130 combines the holograms of the respective colors diffracted by the SLMs 122, 124, and 126.

The hologram generating optical system 140 generates a digital color hologram capable of expressing a three-dimensional image from a hologram in which the colors are synthesized.

The hologram image optical system 150 performs optical processing such as filtering, expansion, or projection on the color hologram generated by the hologram generation optical system 140 to generate a final digital color hologram.

Figure 2:
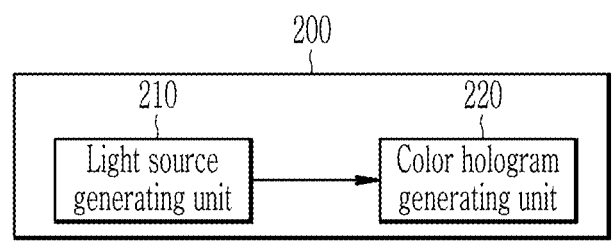
FIG. 2 is a diagram schematically illustrating a digital color holographic display device according to an exemplary embodiment of the present invention.

FIG. 2 is a diagram schematically illustrating a digital color holographic display device according to an exemplary embodiment of the present invention.

Referring to FIG. 2, the digital color holographic display device 200 may include a white light source generating unit 210 and a color hologram generating unit 220.

The white light source generating unit 210 generates a white light source using the coherent light source. For example, red, green, and blue laser light sources may be used as the coherent light source. In FIG. 2, the red, green, and blue laser light sources are illustrated to generate a white light source, but laser light sources of different colors may be used.

The color hologram generating unit 220 separates the white light sources generated by the white light source generating unit 210 for each color and the separated color light is incident on the SLMs corresponding to the respective colors and the hologram of each color is generated by the CGH displayed in the SLM corresponding to each color and thereafter, the holograms of the respective colors are synthesized again to generate the digital color hologram.

Figure 3:
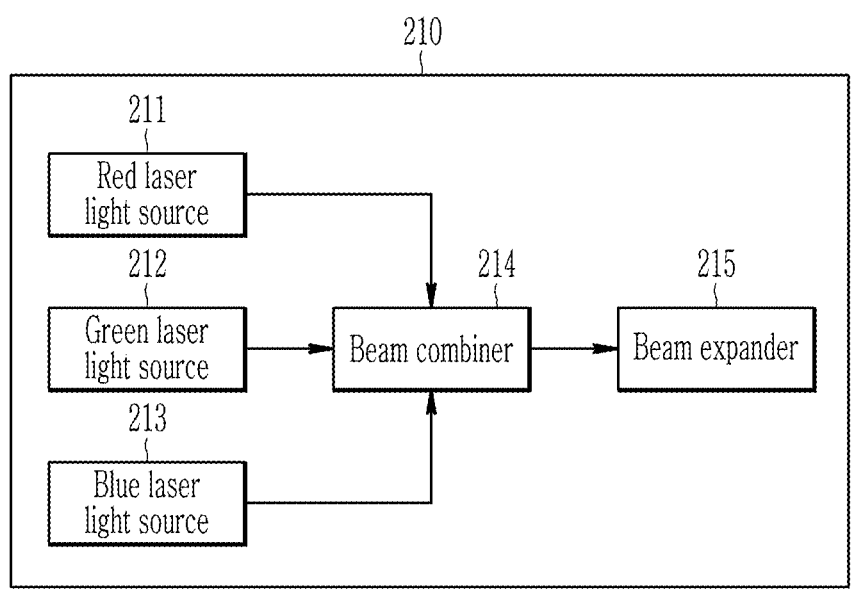
FIG. 3 is a diagram illustrating an example of a white light source generating unit illustrated in FIG. 2.

FIG. 3 is a diagram illustrating an example of a white light source generating unit illustrated in FIG. 2.

Referring to FIG. 3, the white light source generating unit 210 may include a red laser light source 211, a green laser light source 212, a blue laser light source 213, a beam combiner 214, and a beam expander 215.

The red laser light source 211, the green laser light source 212, and the blue laser light source 213 are connected with the beam combiner 214 through optical fibers, respectively. The red laser light source 211, the green laser light source 212, and the blue laser light source 213 output red, green, and blue light to the beam combiner 214 through the optical fibers, respectively. The red laser light source 211, the green laser light source 212, and the blue laser light source 213 output light having a single wavelength among 620 nm to 670 nm, 510 nm to 560 nm, and 440 nm to 490 nm, respectively. For example, the red laser light source 211 may output light having a wavelength of 660 nm, the green laser light source 212 may output light having a wavelength of 532 nm, and the blue laser light source 213 may output light having a wavelength of 473 nm.

The beam combiner 214 combines the red, green, and blue light output from the red laser light source 211, the green laser light source 212, and the blue laser light source 213, respectively. In this case, when the intensity of the red, green, and blue light output from the red laser light source 211, the green laser light source 212, and the blue laser light source 213, respectively is the same, the red, green, and blue light is combined to generate white light.

The beam expander 215 expands the white light generated by the beam combiner 214 into plane waves with uniform intensity and outputs the expanded plane wave to the color hologram generating unit 220. The white light generated by the beam combiner 214 passes through the beam expander 215 and is used as a light source for illuminating the SLM corresponding to each color of the color hologram generating unit 220.

Figure 4:
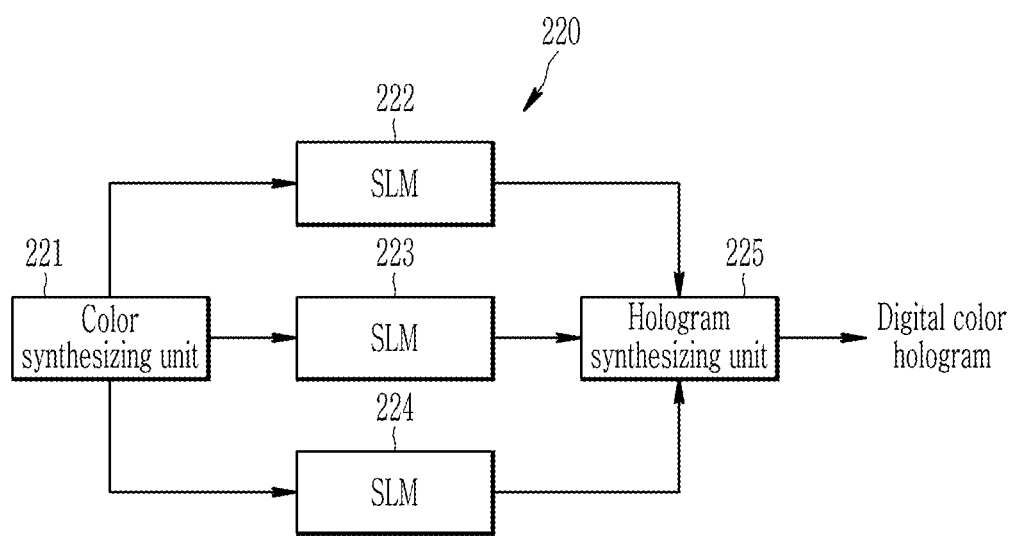
FIG. 4 is a diagram illustrating a color hologram generating unit illustrated in FIG. 2.

FIG. 4 is a diagram illustrating a color hologram generating unit illustrated in FIG. 2.

Referring to FIG. 4, the color hologram generating unit 220 may include a color separating unit 221, SLMs 222, 223, and 224, and a hologram synthesizing unit 225.

The color separating unit 221 separates the red light, the green light, and the blue light from the white light generated by the white light source generating unit 210 and outputs the red light, the green light, and the blue light to the corresponding color SLMs 222, 223, and 224, respectively.

The SLMs 222, 223, and 224 output the red light, the green light, and the blue light, respectively by diffracting the CGH of the corresponding color component.

A hologram synthesizing unit 127 synthesizes the holograms of the respective colors output from the SLMs 222, 223, and 224 to generate the digital color hologram. The hologram synthesizing unit 127 may be constituted by the color synthesis optical system 130, the hologram generation optical system 140, and the hologram image optical system 150 shown in FIG. 1.

Figure 5:
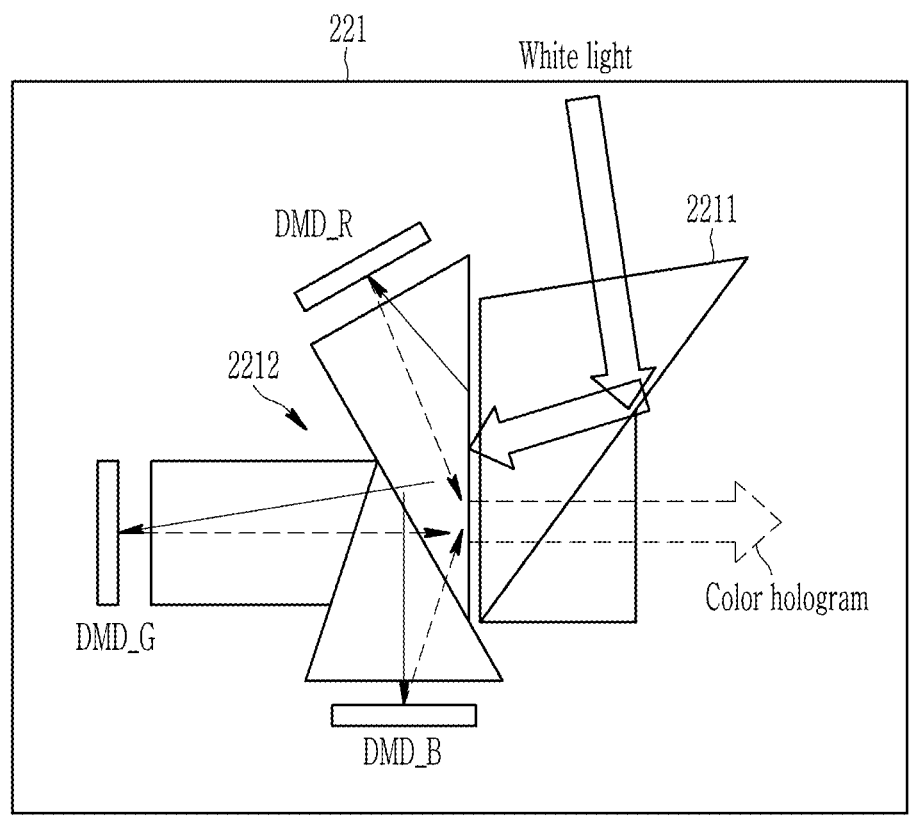
FIG. 5 is a diagram illustrating an example in which the color hologram generating unit illustrated in FIG. 4 is implemented by using an optical element.

FIG. 5 is a diagram illustrating an example in which the color hologram generating unit illustrated in FIG. 4 is implemented by using an optical element.

Referring to FIG. 5, a function of the color separating unit 221 may be implemented by a total reflection prism 2211 and a trichroic prism 2212 and the function of the hologram synthesizing unit 127 may be implemented by the total reflection prism 2211.

As the SLMs 122, 124, and 126 corresponding to the respective colors, a red digital micro mirror device (hereinafter, referred to as "DMD_R"), a green DMD (hereinafter referred to as "DMD_G"), and a blue DMD (hereinafter, referred to as "DMD_B") may be used.

The white light generated by the white light source generating unit 210 passes through the total reflection prism 2211 and is incident on the trichroic prism 2212. The white light is separated into the red light, the green light, and the blue light by the trichroic prism 2212 and the red light, the green light, and the blue light, which are separated, are incident on the DMD_R, the DMD_G, and the DMD_B, respectively.

When pixels of the DMD_R, the DMD_G, and the DMD_B are in an on state, the red light, the green light, and the blue light are reflected by the total reflection prism 2211 and pass through the total reflection prism 2211 again along a beam path through which the red light, the green light, and the blue light are incident in the DMD_R, the DMD_G, and the DMD-B, respectively. In this case, the color hologram is generated while each of the red light, the green light, and the blue light passes through the total reflection prism 2211.

When all the pixels of DMD_R, DMD_G, and DMD_B are in the on state, a white surface light source is formed. A technique for generating the colors by illuminating the DMD_R, the DMD_G, and the DMD_B using the total reflection prism 2211 and the trichroic prism 2212 is a technique applied to a 3-chip digital light processing (DLP) projector. The 3-chip DLP projector in the related art aims at forming a 2-dimensional image. However, the exemplary embodiment of the present invention aims at implementing a 3D hologram image by outputting the CGH for each color to corresponding the DMD_R, the DMD_G, and the DMD_B, and selecting only a specific order from a diffracted light signal formed from the CGH in which the input light sources of the respective colors are displayed in the DMD_R, the DMD_G, and the DMD_B, instead of generating a normal 2-dimensional image.

Figure 6:
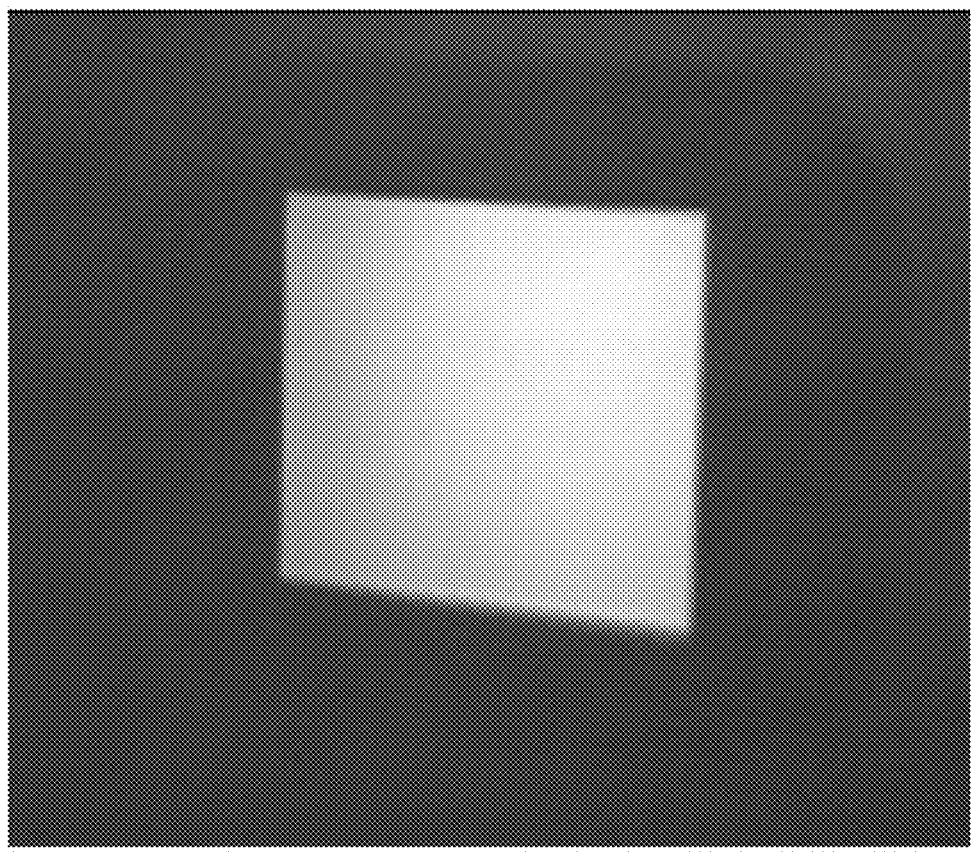
FIG. 6 is a diagram illustrating an example of a color hologram image generated from a structure of FIG. 5.

FIG. 6 is a diagram illustrating an example of a color hologram image generated from a structure of FIG. 5.

Based on the structure of FIG. 5, it is assumed that brightness of the red, green, and blue light sources is uniform. When the pixels of the DMD_R, the DMD_G, and the DMD_B are in the on state, the white hologram image is formed as illustrated in FIG. 6 as the respective color light passes through the total reflection prism 2211 to synthesize the holograms of respective colors. In FIG. 6, solid line arrows indicate paths of beams incident on the DMD_R, the DMD_G, and the DMD_B and dashed arrows indicate the paths of the beams reflected and output from the DMD_R, the DMD_G, and the DMD_B.

Figure 7:
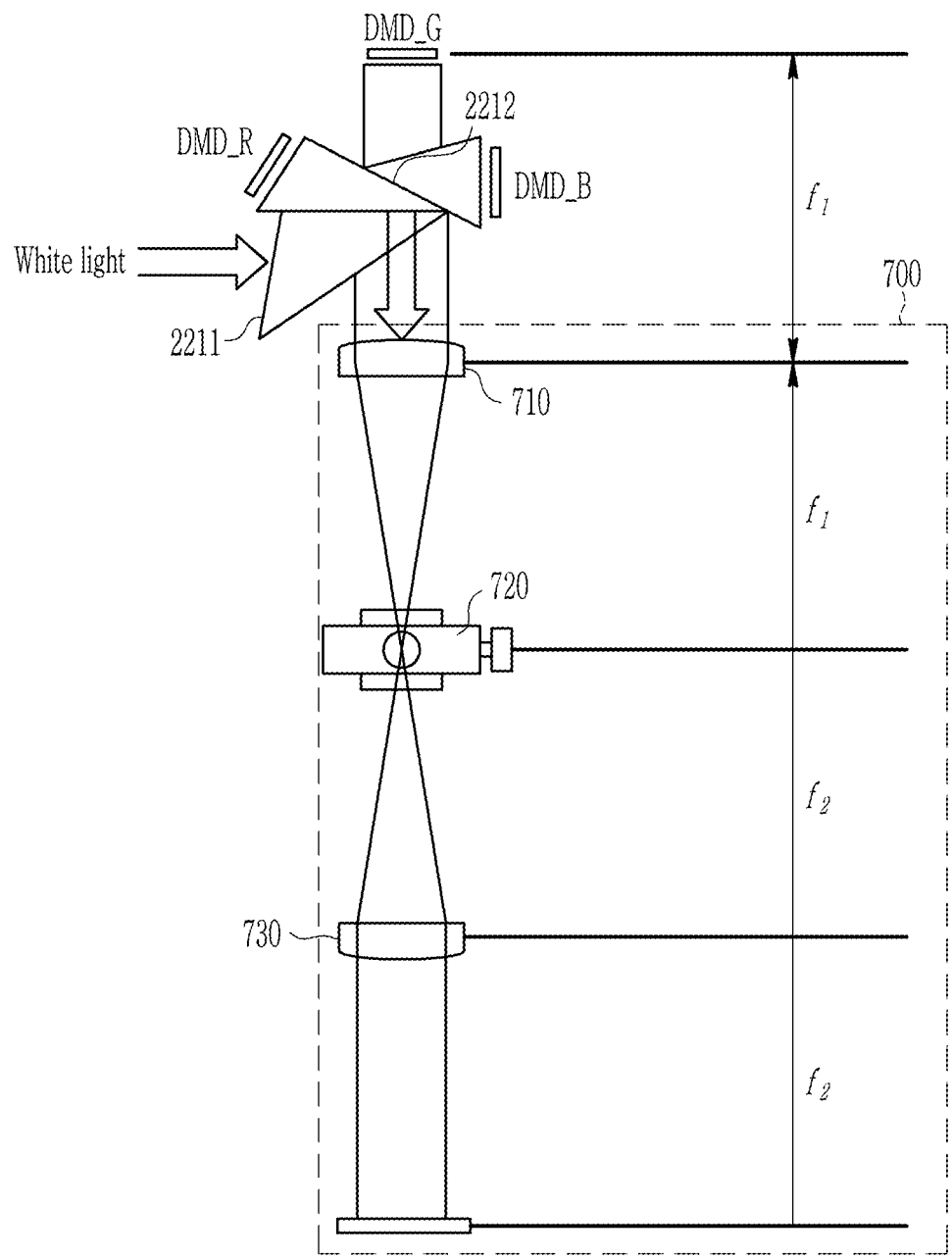
FIG. 7 is a diagram illustrating a 4-f optical system for extracting the color hologram image according to the exemplary embodiment of the present invention.

The image of the hologram illustrated in FIG. 6 is generated by adding the holograms output from the DMD_R, the DMD_G, and the DMD_B corresponding to red, green, and blue, and a 0-th order direct current (DC) signal and the diffracted light signals including a ±1-st order signal, a ±2-nd order signal, and the like exist together. Herein, since the ±1-st order diffracted light signal is used as the hologram image, a 4-f optical system illustrated in FIG. 7 is required to separate only the hologram image. That is, the 4-f optical system selects and outputs only the ±1-st order diffracted light signal from the holograms output from the DMD_R, the DMD_G, and the DMD_B.

FIG. 7 is a diagram illustrating a 4-f optical system for extracting the color hologram image according to the exemplary embodiment of the present invention.

Referring to FIG. 7, the 4-f optical system 700 filters only a +1 or −1-st order diffracted light signal from an image signal of the hologram illustrated in FIG. 6 to finally output the image of the digital color hologram. The 4-f optical system 700 may be a component of the hologram generation optical system 140 or the hologram image optical system 150 illustrated in FIG. 1.

The 4-f optical system 700 may include a first lens 710, a filter 720, and a second lens 730. In FIG. 7, focal distances of the first lens 710 and the second lens 730 are assumed as $f_1$ and $f_2$, respectively.

The first lens 710 is positioned at a location distant from the DMD_G by the focal distance $f_1$. Although illustrated based on the DMD_G in FIG. 7, the DMD_B and the DMD_R are also positioned optically distant from the first lens 710 by the focal distance $f_1$. The image of the color hologram transmitted through the first lens 710 is formed on a focal plane distant from the first lens 710 by the focal distance $f_1$ and the filter 720 is positioned on the focal plane. The filter 720 selects the +1-st order or −1-st order diffracted light signal and the +1-st order or −1-st order diffracted light signal that passes through the filter 720 is shown as the image of the digital color hologram at a location distant from the second lens 730 by the focal distance $f_2$ by passing through the second lens 730.

Figure 8:
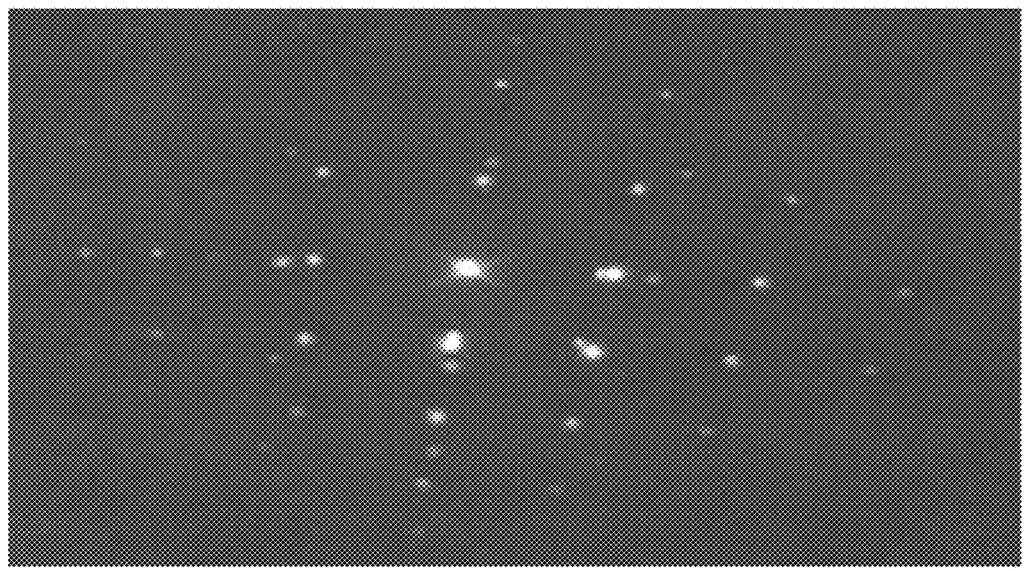
FIG. 8 is a diagram illustrating an example of a focus plane formed at a location where a filter illustrated in FIG. 7 is positioned.

FIG. 8 is a diagram illustrating an example of a focus plane formed at a location where a filter illustrated in FIG. 7 is positioned.

The image of a rectangular white hologram illustrated in FIG. 6 is shown as illustrated in FIG. 8 at a location distant by the focal distance $f_1$ by passing through the first lens 710, that is, the location where the filter 720 is positioned. In other words, only the 0-th order diffracted light signal, DC and the diffracted light signal plane are shown at the center, and red, blue, and green dots are diffracted and separately shown around the DC and the light signal plane by the difference of the pixel interval of the DMD and a light wavelength for each color.

Next, a tiling-based digital color holographic display device capable of increasing the image size of the digital color hologram without loss and expansion of the resolution and the pixel interval of the SLM will be described.

In order to describe the tiling-based digital color holographic display device according to the exemplary embodiment of the present invention, the digital color holographic display device that performs a series of processes before the first lens 710 in FIG. 7 is called the digital color hologram generating unit. The digital color hologram generating unit may be replaced with another similar configuration, and may be configured, for example, using an X-cube prism, not based on the configuration of the total reflection prism and the trichroic prism.

Figure 9:
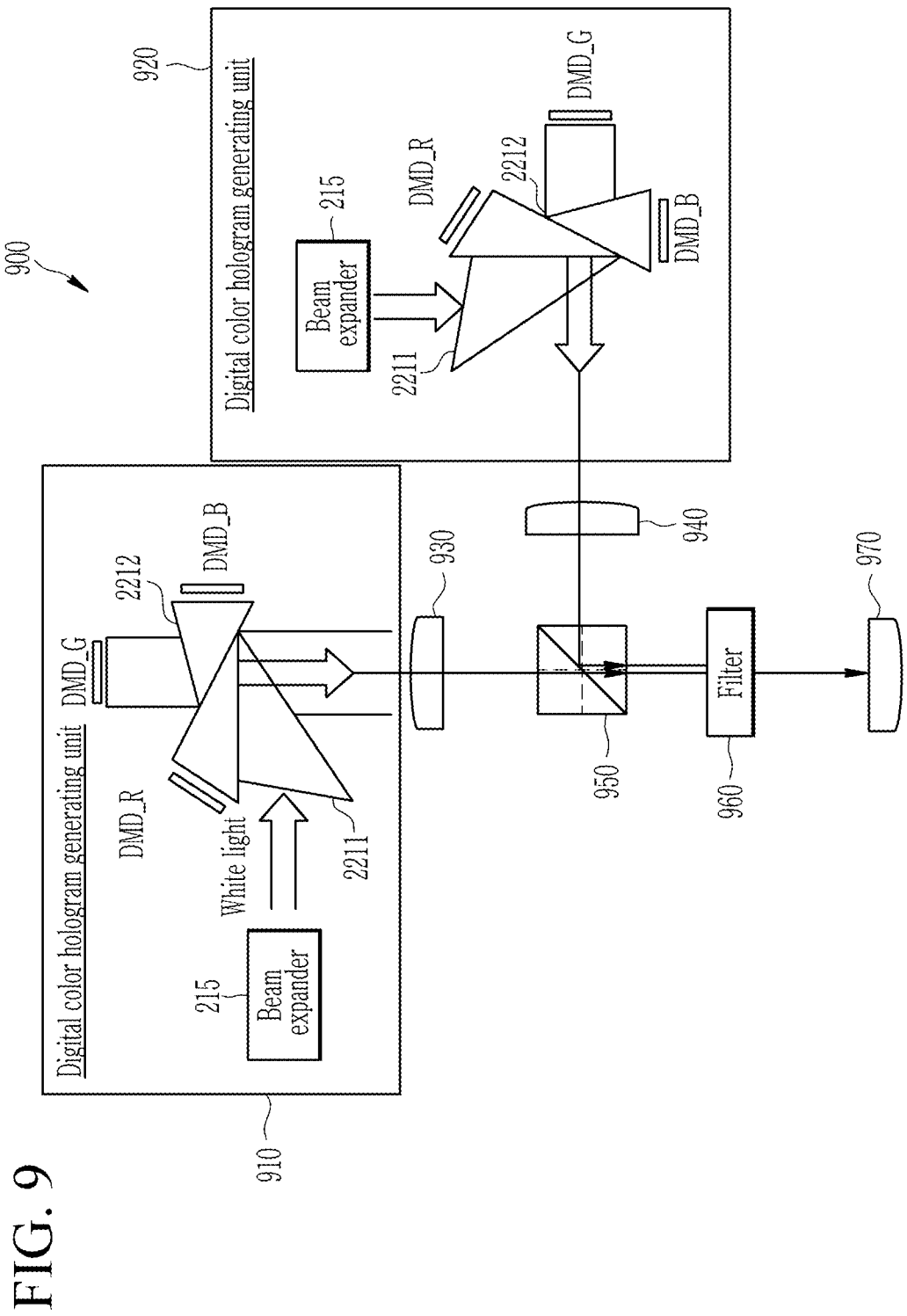
FIG. 9 is a diagram illustrating a digital color holographic display device based on tiling according to another exemplary embodiment of the present invention.

FIG. 9 is a diagram illustrating a digital color holographic display device based on tiling according to another exemplary embodiment of the present invention and illustrates the digital color holographic display device implemented through optical tiling of two digital color hologram generating units. FIG. 9 illustrates only some components of the digital color hologram generating unit are illustrated for easy description.

Referring to FIG. 9, the tiling-based digital color holographic display device 900 may include two digital color hologram generating units 910 and 920, first lenses 930 and 940, a beam combiner 950, a filter 960, and a second lens 970. In this case, the first lenses 930 and 940, the beam combiner 950, the filter 960 and the second lens 970 may be components of a tiling unit (not illustrated) for spatially arranging the color holograms of two digital color hologram generating units 910 and 920 so as not to overlap with each other.

The first lens 930 is positioned at a location distant from the DMD_G of the digital color hologram generating unit 910 by the focal distance $f_1$. The first lens 940 is positioned at a location distant from the DMD_G of the digital color hologram generating unit 920 by the focal distance $f_1$. The beam combiner 950 is positioned on the focal planes of the first lenses 930 and 940. The digital color hologram generating unit 910 and the first lens 930 are arranged such that the image signal of the color hologram of the digital color hologram generating unit 910 is inputted into the beam combiner 950 through the first lens 930 in a vertical direction and the digital color hologram generating unit 920 and the first lens 940 are arranged such that the image signal of the color hologram of the digital color hologram generating unit 920 is input into the beam combiner 950 through the first lens 940 in a horizontal direction. The beam combiner 950 combines the image signals of the color holograms passing through the first lenses 930 and 940, respectively, and transfers the combined image signal to the filter 960. The filter 960 selects the +1-st order or −1-st order diffracted light signal from the image signal of the color hologram coupled by the beam combiner 950 and outputs the selected diffracted light signal to the second lens 970. The second lens 970 is positioned at a location distant from the filter 960 by the focal distance $f_2$ of the second lens 970 and forms the digital color hologram image at the location distant by the focal distance $f_2$.

Based on such a tiling method, a larger hologram image may be implemented.

When a structure of tiling two digital color hologram generating units 910 and 920 as illustrated in FIG. 9 is referred to as 1×1 tiling, m×n tiling may be implemented by k digital color hologram generating units. In this case, k, m, and n are natural numbers and have a relationship of k=m+n. For example, a digital color hologram of a larger image size may be generated by forming a 2×2 tiling structure with four digital color hologram generating units as illustrated in FIG. 10.

Figure 10:
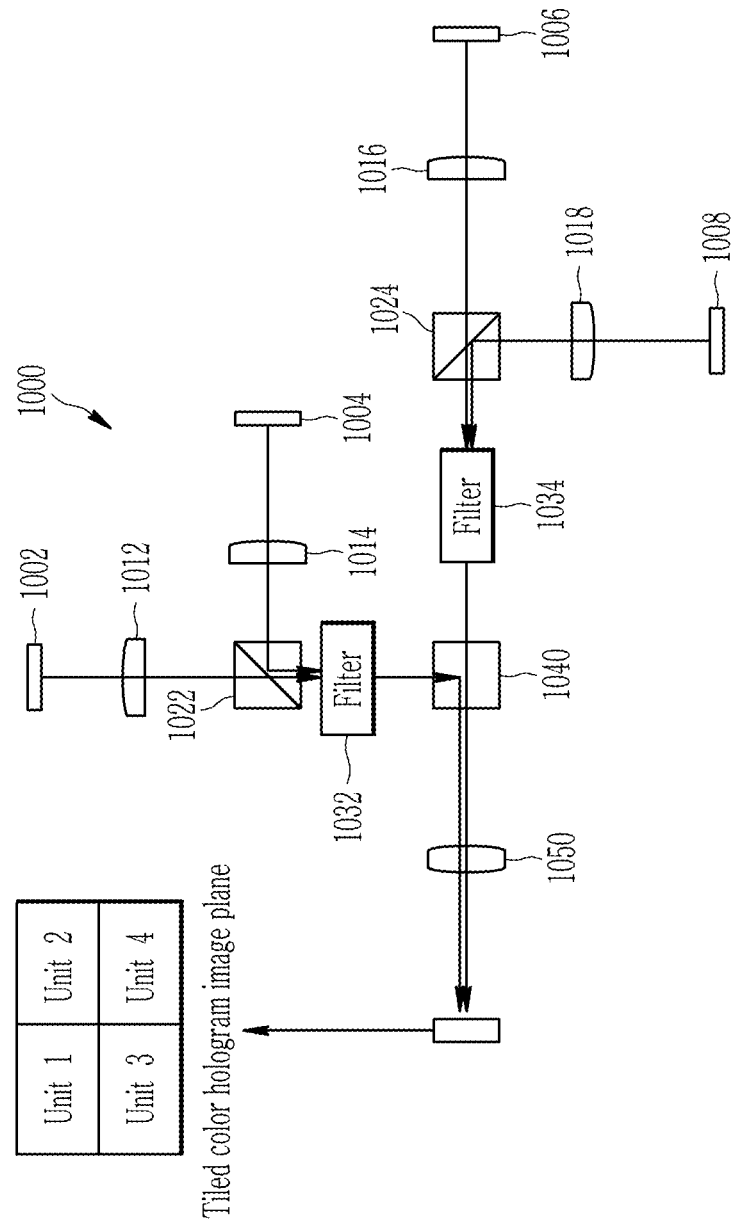
FIG. 10 is a diagram illustrating a digital color holographic display device based on tiling according to yet another exemplary embodiment of the present invention.

FIG. 10 is a diagram illustrating a digital color holographic display device based on tiling according to yet another exemplary embodiment of the present invention.

Referring to FIG. 10, the tiling-based digital color holographic display device 1000 includes four digital color hologram generating units 1002, 1004, 1006, and 1008, first lenses 1012, 1014, 1016, and 1018, first beam combiners 1022 and 1024, filters 1032 and 1034, a second beam combiner 1040, and a second lens 1050.

The digital color hologram generating units 1002 and 1004, the first lenses 1012 and 1014, the first beam combiner 1022, and the filter 1032 have the same structure as the digital color hologram generating units 910 and 920, the first lenses 930 and 940, the beam combiner 950, and the filter 960 described in FIG. 9. Further, the digital color hologram generating units 1006 and 1008, the first lenses 1016 and 1018, the first beam combiner 1024, and the filter 1032 have the same structure as the digital color hologram generating units 910 and 920, the first lenses 930 and 940, the beam combiner 950, and the filter 960 described in FIG. 9.

Optical signals passing through the filters 1032 and 1034 are combined through the second beam combiner 1040 and the tiled color hologram image planes of the digital color hologram generating units 1002, 1004, 1006, and 1008 are generated at the location distant by the focal distance $f_2$ while passing through the second lens 1050.

In this case, the digital color hologram generating units 1002, 1004, 1006, and 1008, the first lenses 1012, 1014, 1016 and 1018, the first beam combiners 1022 and 1024, the filters 1032 and 1034, the second beam combiner 1040, and the second lens 1050 may be disposed so that the digital color holograms generated by four digital color hologram generating units 1002, 1004, 1006, and 1008 respectively are not overlapped or broken but arranged. For example, the digital color hologram generating units 1002 and 1004, the first lenses 1012 and 1014, the first beam combiner 1022, and the filter 1032 may be arranged so that the digital color holograms generated by the digital color hologram generating units 1002 and 1004, respectively are combined by the first beam combiner 1022 and input into the second beam combiner 1040 in the vertical direction of the second beam combiner 1040 through the filter 1032. Further, the digital color hologram generating units 1006 and 1008, the first lenses 1016 and 1018, the first beam combiner 1024, and the filter 1034 may be arranged so that the digital color holograms generated by the digital color hologram generating units 1006 and 1008, respectively are combined by the first beam combiner 1024 and input into the second beam combiner 1040 in the horizontal direction of the second beam combiner 1040 through the filter 1034.

By four digital color hologram generating units 1002, 1004, 1006, and 1008, tiling of arrays of 1×3 and 3×1 is available as well as 2×2 tiling. Further, after the second lenses 970 and 1050 of FIGS. 9 and 10, various types of digital color holographic display devices may be implemented by using additional lenses and optical systems.

Meanwhile, not only tiling through the beam combiners (reference numeral 950 of FIG. 9 and reference numerals 1022, 1024, and 1040 of FIG. 10) but also tiling by using the total reflection prism is available. An example of tiling of the digital color hologram generating unit implemented using the total reflection prism will be described with reference to FIGS. 11 and 12.

Figure 11:
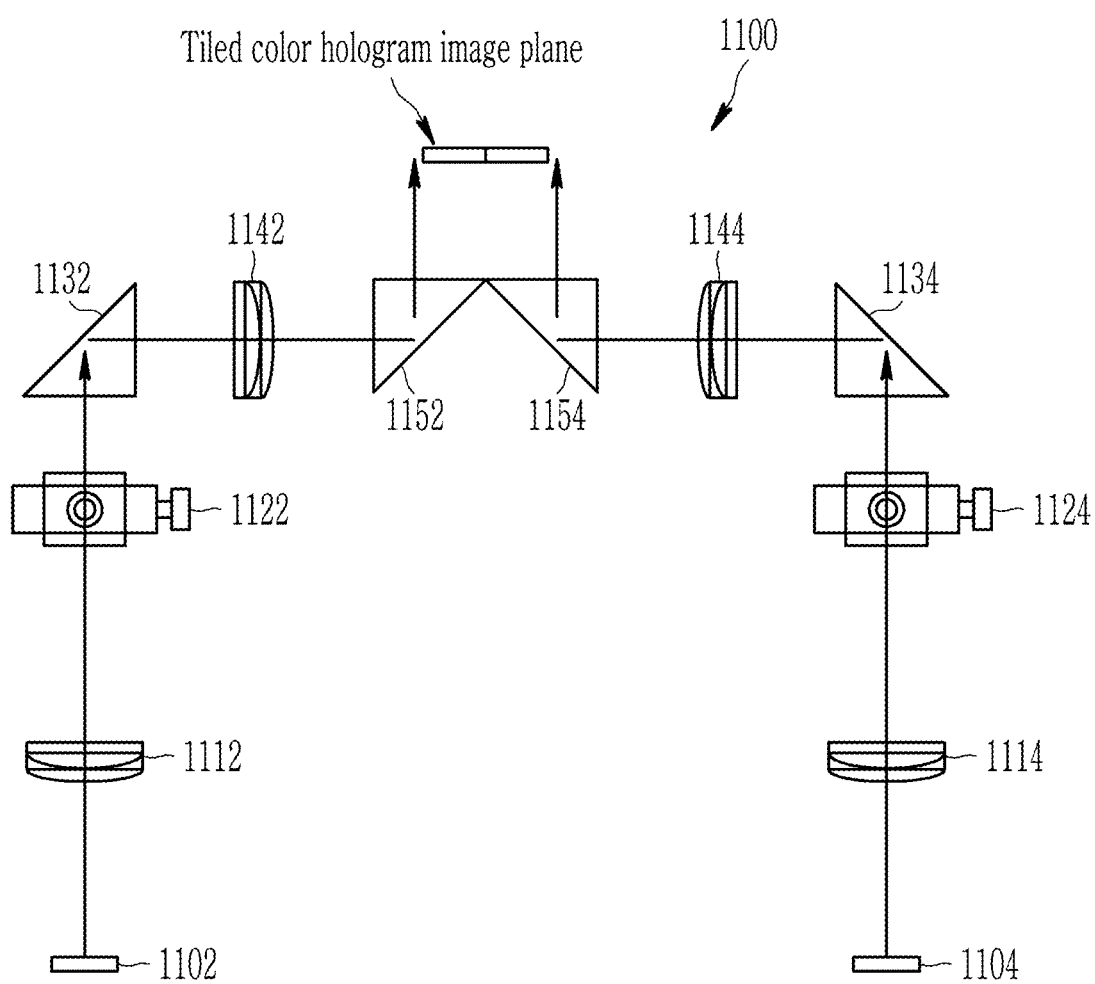
FIGS. 11 and 12 are diagrams illustrating a digital color holographic display device based on tiling according to still yet another exemplary embodiment of the present invention.
Figure 12:
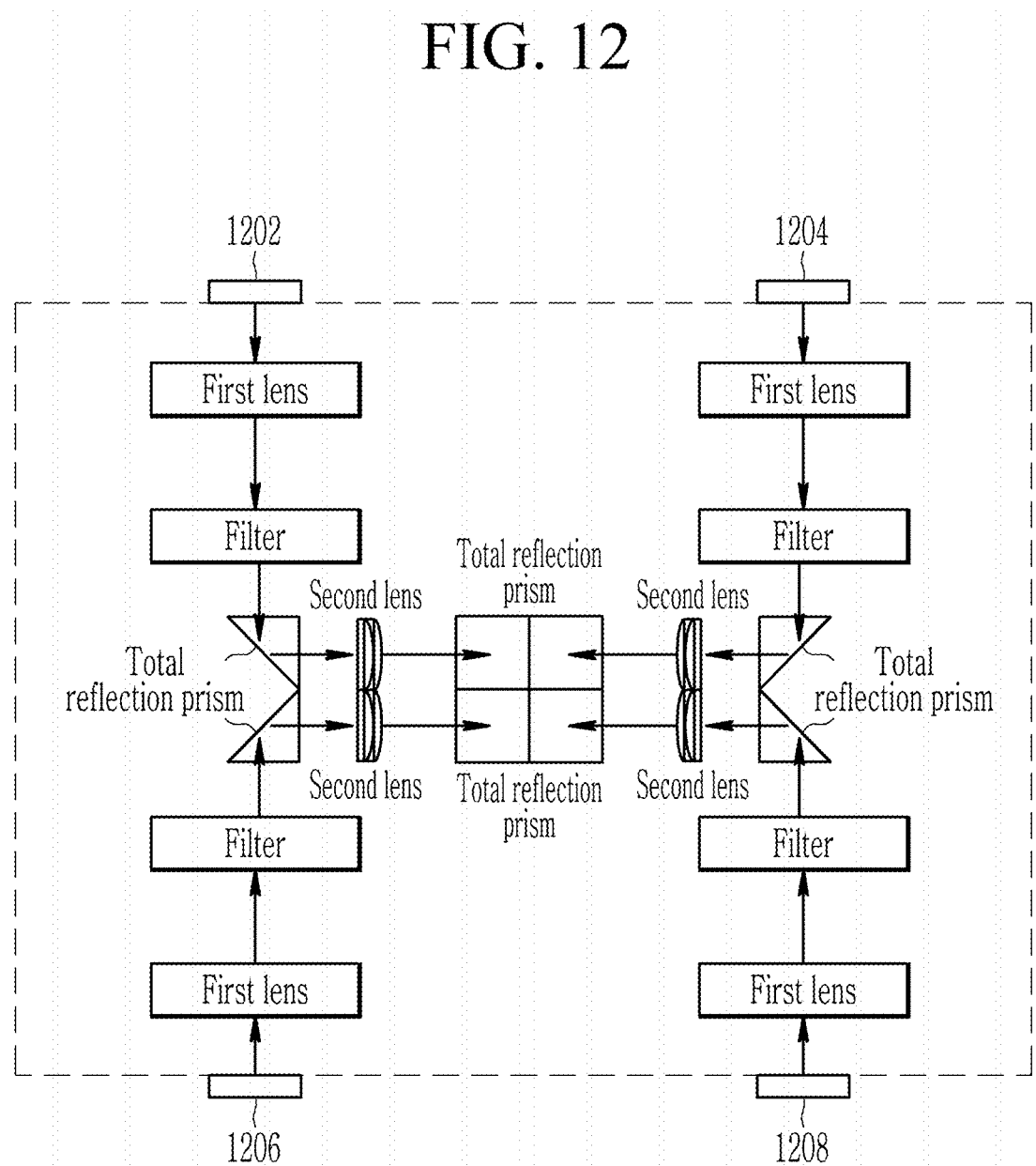

FIGS. 11 and 12 are diagrams illustrating a digital color holographic display device based on tiling according to still yet another exemplary embodiment of the present invention. FIG. 11 illustrates a method of performing 1×1 tiling of two color hologram image units 1102 and 1104 using total reflection prisms 1132, 1152, 1134, and 1154.

As illustrated in FIG. 11, the tiling-based digital color holographic display device 1100 may include two color hologram image units 1102 and 1104, first lenses 1112 and 1114, filters 1122 and 1124, total reflection prisms 1132 and 1134, second lenses 1142 and 1144, and total reflection prisms 1152 and 1154. When the total reflection prisms 1132, 1152, 1134, and 1154 are used as described above, incident light may be reflected 100%. The first lenses 1112 and 1114, the filters 1122 and 1124, the total reflection prisms 1132 and 1134, the second lenses 1142 and 1144, and the total reflection prisms 1152 and 1154 may also be components of the tiling unit.

The digital color hologram generated by the digital color hologram generating unit 1102 is transmitted to the total reflection prism 1132 through the first lens 1112 and the filter 1122. The +1-st order or −1-st order diffracted light signal passing through the filter 1122 is reflected 100% by the total reflection prism 1132 and passes through the second lens 1142 and is totally reflected by the total reflection prism 1152 positioned at the location distant by the focal distance $f_2$ of the second lens 1142 to form the color hologram image.

Similarly, the digital color hologram generated by the digital color hologram generating unit 1104 is transferred to the total reflection prism 1134 through the first lens 1114 and the filter 1124. The +1-st order or −1-st order diffracted light signal passing through the filter 1124 is reflected 100% by the total reflection prism 1134 and passes through the second lens 1144 and is totally reflected by the total reflection prism 1154 positioned at the location distant by the focal distance $f_2$ of the second lens 1144 to form the color hologram image.

In this case, the color hologram image units 1102 and 1104, the first lenses 1112 and 1114, the filters 1122 and 1124, the total reflection prisms 1132 and 1134, and the second lenses 1142 and 1144 may be appropriately positioned so that the color hologram images formed by the total reflection prisms 1152 and 1154, respectively are not overlapped or broken but arranged.

By such a configuration, the titled color hologram image planes may be generated by two digital color hologram generating units 1102 and 1104.

Further, the digital color holographic display device may be implemented by applying additional lenses and optical systems after the color hologram image planes displayed by the total reflection prisms 1152 and 1154, respectively.

In addition, as illustrated in FIG. 12, 2×2 tiling may be configured with the four digital color hologram generating units 1202, 1204, 1206, and 1208 illustrated in FIG. 10 by applying the tiling method of FIG. 11 and the tiling is available even in the arrays 1×3 and 3×1.

Figure 13:
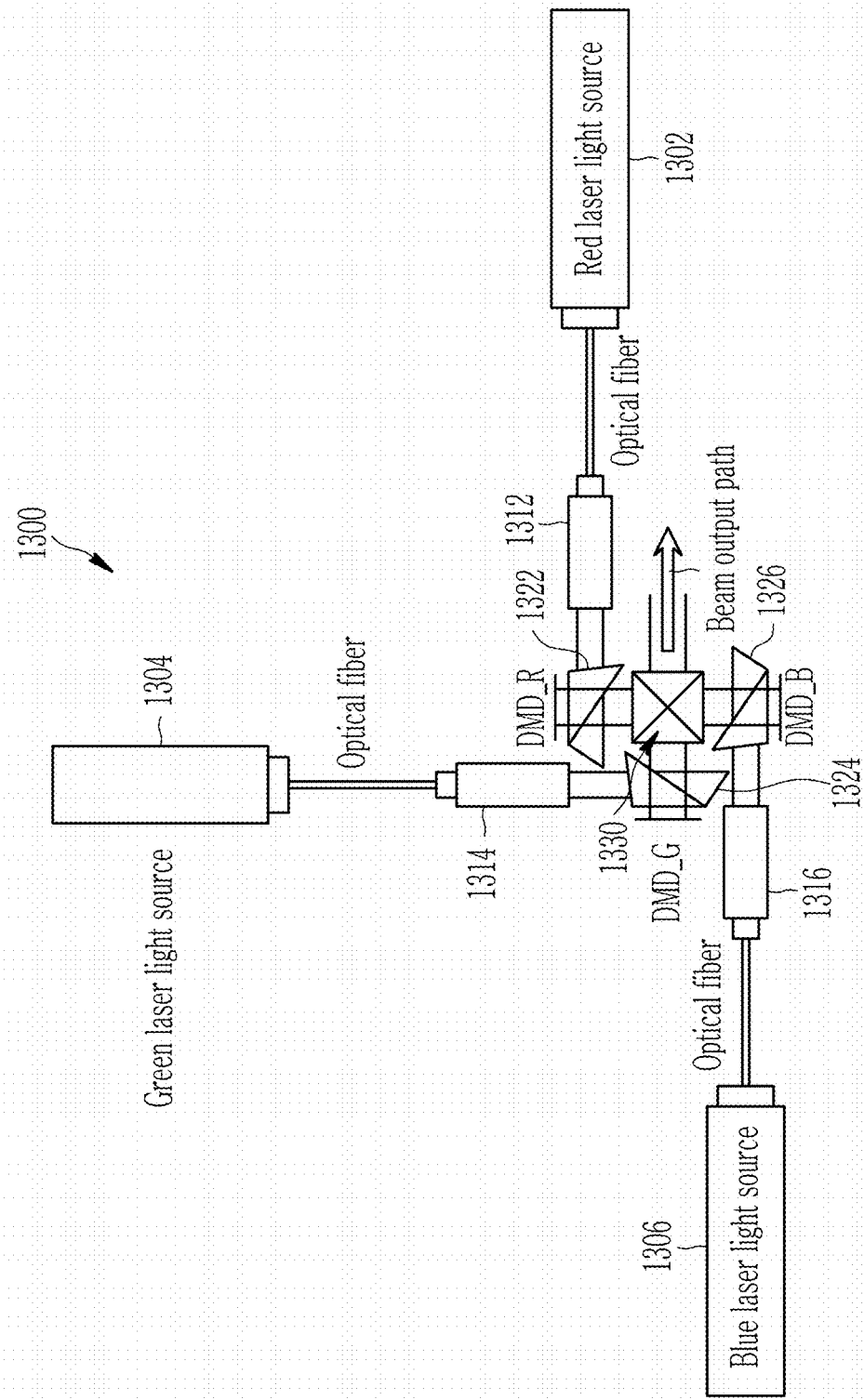
FIG. 13 is a diagram illustrating an example of a digital color hologram generating unit according to another exemplary embodiment of the present invention.

Meanwhile, the digital color hologram generating unit may be configured by using the X-cube prism as illustrated in FIG. 13.

FIG. 13 is a diagram illustrating an example of a digital color hologram generating unit according to another exemplary embodiment of the present invention.

As illustrated in FIG. 13, the digital color hologram generating unit 1300 may include a red laser light source 1302, a green laser light source 1304, a blue laser light source 1306, beam expanders 1312, 1314, and 1316, total reflection prisms 1322, 1324, and 1326, an X-cube prism 1340, a DMD_R, a DMD_G, and a DMD_B.

The red laser light source 1302, the green laser light source 1304, and the blue laser light source 1306 output red, green, and blue light, respectively.

The beam expanders 1312, 1314 and 1316 expand the red, green and blue light output from the red laser light source 1302, the green laser light source 1304 and the blue laser light source 1306, respectively to plane waves with uniform intensity and output the plane waves to the total reflection prisms 1322, 1324, and 1326.

The total reflection prisms 1322, 1324, and 1326 totally reflect the red, green, and blue light and output the total reflected red, green, and blue light to the DMD_R, DMD_G, and DMD_B to illuminate the red, green, and blue light to the DMD_R, DMD_G, and DMD_B, respectively.

The X-cube prism 1340 is configured to output the image signals of the color holograms output from the DMD_R, DMD_G, and DMD_B through a beam output path. The image signal of the color hologram output through the beam output path may be transferred to the first lens of the 4-f optical system.

In addition, a digital color hologram having a larger image size may be implemented by applying the tiling method to the digital color hologram generating unit 1300 illustrated in FIG. 13.

Figure 14:
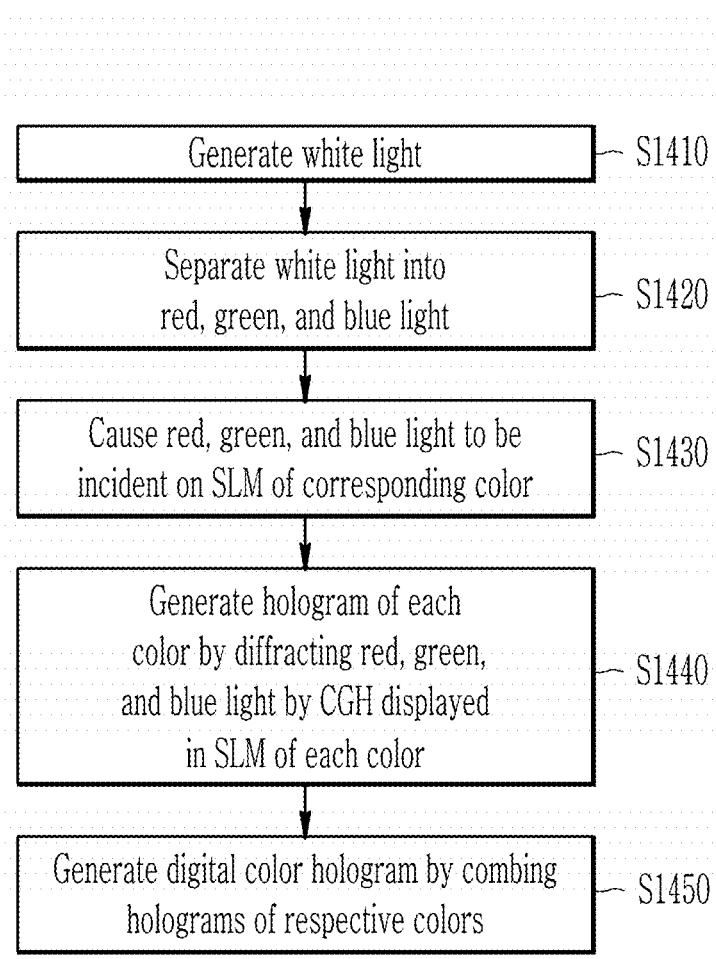
FIG. 14 is a flowchart illustrating a method for generating a digital color hologram according to an exemplary embodiment of the present invention.

FIG. 14 is a flowchart illustrating a method for generating a digital color hologram according to an exemplary embodiment of the present invention and is described based on the structures illustrated in FIGS. 2 to 7.

Referring to FIG. 14, the digital color holographic display device 200 generates the white light using the coherent light source (S1410).

The digital color holographic display device 200 separates the white light into the red, green, and blue light (S1420), and causes the red, green, and blue light to be incident on the SLMs of the corresponding colors, respectively (S1430).

The digital color holographic display device 200 diffracts the red, green, and blue light by the CGH displayed on the SLM of each color to generate holograms of respective colors (S1440) and then, synthesizes the holograms of the respective colors again to generate the digital color hologram (S1450).

According to exemplary embodiments of the present invention, a digital color hologram generating unit can be configured, multiple digital color hologram generating units can be tiled without loss and expansion of resolution and a pixel interval of an SLM, the size of a digital color hologram image can be expanded through tiling of the multiple digital color hologram generating units.

Further, according to the exemplary embodiments of the present invention, various types of digital color holographic display devices can be implemented by using additional lenses and optical systems.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A digital color holographic display device using tiling, comprising:
   a plurality of digital color hologram generating units generating digital color holograms, respectively; and
   a tiling unit spatially arranging the digital color holograms of the plurality of digital color hologram generating units through an optical tiling method so as not to overlap with each other, wherein the tiling unit includes:
      a plurality of first lenses respectively forming digital color holograms of the plurality of digital color hologram generating units on a focal plane of a first focal distance,
      a first beam combiner outputting each of the digital color holograms of the plurality of digital color hologram generating units passing through the first lenses,
      at least one filter positioned on the focal plane of at least one of first lenses and filtering the digital color holograms of the plurality of digital color hologram generating units, and
      at least one second lens forming the filtered digital color holograms on a focal plane of a second focal distance so as not to overlap with each other.

2. The device of claim 1, wherein:
   when the plurality of digital color hologram generating units are grouped into one or more pairs, the numbers of first lenses, first beam combiners, and filters correspond to the number of pairs, and
   the tiling unit further includes a second beam combiner for outputting each of the filtered digital color holograms respectively output from the filters to the second lenses when the number of filters is 2 or more.

3. The device of claim 1, wherein:
the first beam combiner is a beam separator transmitting or reflecting the input digital color hologram.

4. The device of claim 1, wherein the tiling unit includes:
a plurality of filters respectively filtering the plurality of digital color holograms passing through the plurality of first lenses, respectively,
a plurality of first total reflection prisms totally reflecting the filtered digital color holograms passing through the plurality of filters,
a plurality of second lenses forming the digital color holograms totally reflected by the plurality of first total reflection prisms, respectively on the focal plane of the second focal distance, and
a plurality of second total reflection prisms positioned on the focal planes of the second focal distances of the plurality of second lenses, respectively to totally reflect the digital color hologram on the focal plane of the second focal distance, and
wherein the plurality of digital color holograms totally reflected by the plurality of second total reflection prisms is formed in space without overlapping with each other.

5. The device of claim 1, wherein each of the plurality of digital color hologram generating units includes:
a white light source generating unit generating white light, and
a color hologram generating unit including first to third space light modulator in which computer generated holograms (CHGs) of first to third colors are displayed, respectively and separating the white light into light of a first color, light of a second color, and light of a third color and outputting the first color light, the second color light, and the third color light to the first to third space light modulators, respectively to generate a digital color hologram.

6. The device of claim 5, wherein:
the white light source generating unit includes
first to third laser light sources outputting the light of the first to third colors, respectively,
a beam combiner combining the light of the first to third colors to generate the white light, and
a beam expander expanding the white light to a plane wave with uniform intensity and outputting the plane wave to the color hologram generating unit.

7. The device of claim 5, wherein:
the color hologram generating unit includes
a total reflection prism totally reflecting the white light and transmitting holograms of the first to third colors output from the first to third space light modulators, and
a trichroic prism separating the white light totally reflected by the total reflection prism into first to third light and outputting the first to third light to the first to third space light modulators.

8. The device of claim 5, wherein:
the first to third space light modulators diffract and output the light of the first to third colors by the CGHs of the first to third colors, and
the color hologram generating unit includes a hologram synthesizing unit synthesizing the holograms of the respective colors output from the first to third space light modulators to generate the digital color hologram.

9. The device of claim 1, wherein each of the plurality of digital color hologram generating units includes:
first to third space light modulators diffracting the light of the first to third colors incident while the computer generated holograms (CGHs) of the first to third colors are displayed, respectively by the CGHs of the first to third colors,
first to third laser light sources outputting the light of the first to third colors, respectively,
first to third beam expanders expanding the light of the first to third colors to the plane wave with uniform intensity,
first to third total reflection prisms totally reflecting the light of first to third colors output from the first to third beam expanders and outputting the totally reflected light to the first to third space light modulators, respectively, and
an X-cube prism outputting the holograms of the first to third colors diffracted by the first to third space light modulators, respectively.

* * * * *